United States Patent [19]

Endres et al.

[11] 4,271,130

[45] Jun. 2, 1981

[54] PROCESS FOR THE PREPARATION OF ZEOLITE A FROM KAOLIN

[75] Inventors: Robert Endres, Cologne; Heinz Drave, Leverkusen; Manfred Mansmann, Leverkusen; Lothar Puppe, Leverkusen, all of Fed. Rep. of Germany

[73] Assignee: Bayer Aktiengesellschaft, Leverkusen, Fed. Rep. of Germany

[21] Appl. No.: 95,750

[22] Filed: Nov. 19, 1979

[30] Foreign Application Priority Data

Dec. 6, 1978 [DE] Fed. Rep. of Germany ....... 2852674

[51] Int. Cl.³ .......................... C01B 33/28; C02F 1/42; C11D 3/12
[52] U.S. Cl. ..................................... 423/118; 252/140; 252/174.25; 252/179; 423/264; 423/328
[58] Field of Search ............... 423/118, 328, 329, 264; 252/131, 140, 174.25, 179

[56] References Cited

U.S. PATENT DOCUMENTS

| | | | |
|---|---|---|---|
| 2,307,239 | 1/1943 | Rowland | 423/328 |
| 3,021,195 | 2/1962 | Podschus | 423/328 |
| 3,939,246 | 2/1976 | Rollmann | 423/118 |
| 4,034,058 | 7/1977 | Jameson | 423/118 |
| 4,075,280 | 2/1978 | Fitton | 423/118 |
| 4,089,929 | 5/1978 | Christophliemk | 423/118 |

FOREIGN PATENT DOCUMENTS

2271186 12/1975 France ..................................... 423/118

*Primary Examiner*—Dennis L. Albrecht
*Attorney, Agent, or Firm*—Sprung, Felfe, Horn, Lynch & Kramer

[57] ABSTRACT

The invention provides a process for the production of zeolite A from kaolin by conversion of the kaolin into meta-kaolin followed by reaction of the meta-kaolin in an aqueous alkaline medium, wherein the conversion of the kaolin into the meta-kaolin is conducted at temperatures of between 700° and 950° C. in the presence of alkaline earth compounds and optionally in the presence of uncolored halides and/or halogens, wherein the process may be conducted under reducing conditions and in the presence of alkali metal compounds.

6 Claims, No Drawings

PROCESS FOR THE PREPARATION OF ZEOLITE A FROM KAOLIN

This invention relates to an improved process for the preparation of zeolite A with increased lightness and reduced yellowness. The terms "lightness" and "yellowness" in the context of this invention mean the colour values conforming to the colour measuring system of Hunter, Fairfax, Va., USA. The lightness L and yellowness b of the zeolite material are measured with a colour measuring instrument D 25 D 2 P of the aforesaid company using a measuring geometry of 8°/0° in a standard illuminant C.

The zeolite materials prepared according to the invention may be used for various purposes and are particularly intended for use in detergents and cleaning materials.

Detergents and cleaning materials in which zeolite A may be used as builder to replace a substantial proportion of sodium triphosphate have been described e.g. in German Offenlegungsschrift No. 2,412,837. The preparation of zeolite A has been known for a long time as has also its ion-exchange properties (see e.g. German Auslegeschrift No. 1,038,017). One economically advantageous method of preparing zeolite A starts with naturally occurring aluminosilicates, in particular kaolin (see e.g. German Offenlegungsschrift No. 1,467,051). Pure commercial products of kaolin consist to an extent of more than 90% of the mineral clay kaolinite having the approximate formula $Al_2O_3.2\ SiO_2.2\ H_2O$. The different types of kaolin used, for example, in the paper industry are assessed according to their brightness. Only bright types of kaolin having a brightness value L higher than about 88 are suitable for the envisaged use for the preparation of zeolite for detergents. These bright kaolin qualities, however, have iron contents ranging from about 1000 to 5000 ppm. The types of zeolite A synthesized from such kaolin have less brightness and a deeper yellowness than zeolite A produced from alkali metal silicate and alkali metal aluminate solutions. Such a material has been proposed in German Offenlegungsschrift No. 2,601,217 as builder for detergents. Although these products do not entail any disadvantages when used as phosphate substitutes in detergents and cleaning agents, the zeolite imparts to the detergent an appearance which could give an impression of inferior quality to the consumer.

The problem was therefore to produce a brighter and less yellow zeolite A from this inexpensive kaolin which is available in virtually unlimited quantities and yet retain the well known advantageous properties such as the calcium-exchange capacity, calcium-exchange kinetics and particle size distribution.

The present invention therefore provides a process for the preparation of zeolite A from kaolin by conversion of the kaolin into meta-kaolin followed by reaction of the meta-kaolin in an aqueous alkaline medium, characterised in that the conversion of kaolin into meta-kaolin is carried out at temperatures of between 700° and 950° C. in the presence of alkaline earth compounds and optionally in the presence of uncoloured halides and/or halogens.

A preferred embodiment of the process according to the invention comprises carrying out the conversion of kaolin into metakaolin under reducing conditions and optionally in the presence of alkali metal compounds.

Surprisingly brigher zeolite A cannot be synthesized from every type of brightened meta-kaolin. Thus, although a much brighter meta-kaolin can be obtained after calcining, e.g. by the addition of NaCl and peat coal, the zeolite A synthesised from it has a yellowness and is reduced in lightness. Only if alkaline earth metal compounds are also added to the mixture of raw materials before annealing can the increase in lightness and reduction in yellowness achieved in the meta-kaolin be maintained throughout the synthesis to zeolite A.

By means of the methods according to the invention which are, in addition, able to be conducted economically, the lightness can be increased and the yellowness reduced to such an extent that the colour values of a waterglass aluminate zeolite can be achieved. The calcium-exchange capacity of the zeolite is not reduced by the additives.

The formation of meta-kaolin according to the known art is carried out by heating kaolin to 500° to 800° C. for 2 to 4 hours. As is well known, further heating to higher temperatures gives rise to a spinel phase and mullite in addition to cristobalite. When these crystal forms are produced, the reaction of calcined kaolin with the aqueous alkaline solution is so seriously disturbed that only products with an inadequate calcium-exchange capacity are obtained (calcium-exchange capacity is determined according to a method suitable for detergent manufacturers, e.g. as described in German Offenlegungsschrift No. 2,416,837). For the greatest effect of the measures according to the invention, it has been found advisable to use the highest possible temperatures for meta-kaolin formation. If kaolin is heated for a period of 5 minutes to 2 hours to temperatures in the range of from 700° to 950° C., the longer period being, of course, used for the lower temperatures and the shorter periods for higher temperatures, no adverse effect on the calcium-binding capacity is found after the subsequent conversion of the meta-kaolin to zeolite A. Heating to temperatures of 820° to 900° C. for periods of 5 to 80 minutes has been found particularly suitable for kaolins from various sources. The most suitable calcining conditions for kaolin in any individual case can easily be determined by a few experiments on the basis of the resulting calcium-binding capacity of the zeolite obtained.

The alkaline earth metal compounds used for the process according to the invention are magnesium, calcium, strontium and/or barium compounds, such as for example sulphates, carbonates, hydroxides, nitrates, nitrites, halides or the oxides. The alkaline earth compound preferably used is finely divided magnesium oxide, carbonate and/or hydroxide carbonate.

Fluorides, chlorides and/or bromides, the hydrogen halides, or the halogens themselves, are used as uncoloured halides. The cations which may be used are the elements of all main and secondary groups of the periodic table of the elements which do not cause any discoloration under the described conditions. The following have for example proven to be advantageous, without herewith implying an additional restriction with regard to usability: hydrogen chloride, alkali metal halides, alkaline earth halides and earth metal halides, halides of boron, carbon, silicon, phosphorus, sulphur, and zinc, titanium and zirconium halides. Common rock salt is particularly preferred.

As reduction agents carbons such as charcoal, petroleum coke, peat coal or carbon black are used as reducing agents, in other words, raw materials which burn almost without leaving any residue of ash and therefore do not impair the colour of meta-kaolin by ash residues. Alkali metal sulphite, pyrosulphite, bisulphite or dithionite may also be used. Peat coal is preferred on economical and technical grounds.

Instead of in the presence of carbon the calcination can also be conducted in a gas stream containing CO, e.g. in pure CO or $CO/N_2$ mixtures. In addition generator gas, water gas, hydrocarbons and fuels which do not leave any impurities in the kaolin may be used.

Sulphates, carbonates, formates, acetates, oxalates, hydroxides, nitrates and nitrites of the alkali metals, in particular lithium, sodium and/or potassium, should for example by understood by the term alkali metal compounds under the scope of the present invention, and not, however, the alkali metal halides which are included under the term 'uncoloured halides' of the alkali metal compounds soda is preferred.

The quantity of the alkaline earth, alkali metal and uncoloured halogen compounds added is between 0.1 and 10% by weight, calculated as alkaline earth oxide and alkali metal oxide or as halogen and based on the kaolin, and preferably between 0,2 and 2%. The quantities of reduction agent added are between 0.1 and 10% by weight, based on the kaolin, preferably, however, between 0.5 and 5% by weight.

These compounds may be mixed with the kaolin as dry solids, preferably as very fine powders. They may also be mixed wet, the compounds being added to the kaolin suspension in either soluble or an insoluble form.

The heating of the kaolin to meta-kaolin is carried out in known manner in muffle furnaces, chamber furnaces, open-hearth furnaces or rotary furnaces or other suitable apparatus. The calcination of the kaolin mixture can be carried out particularly advantageously in a flash-heating apparatus, as for example described in GB PS 869 966 and US PS 3 021 195. In this the kaolin is converted into meta-kaolin by flash-heating at temperatures of between 600° and 1,000° C. at a residence time of 0.01 to 5 seconds. However, in this process the necessary minimum residence time of 5 minutes is not reached, with the result that, although the flash-heating according to the prior art yields finely-divided meta-kaolin with a very low residual water content, the necessary brightening of and improvement in the colour is not achieved.

In order to obtain the desired increase in lightness and the desired reduction of the yellowness a subsequent annealing step is necessary. This preferred embodiment of the process according to the invention is characterised in that the conversion of the kaolin into meta-kaolin is carried out by flash-heating at temperatures of between 600° and 1,000° C. at a residence time of 0.01 to 5 seconds and subsequent annealing at temperatures between 700° and 950° C.

An annealing apparatus is connected to an apparatus for flash-heating, the flash-heated kaolin being discharged into the annealing apparatus and kept at the required temperature of between 700° and 950° C. for between 5 minutes and 2 hours. If CO-containing gases are used as the reduction agent as it is preferred, it is then recommendable to lead these directly into the annealing apparatus. In the case of the addition of carbon, after the calcination the unburnt carbon is burned by the introduction of atmospheric oxygen, the temperature in this step also being able to be in the range between 950° and 700° C., but also lower, to as far down as about 500° C. Gaseous halides or halogens, preferably hydrogen chloride, are also led directly into the annealing apparatus.

The flash-heated kaolin mixture differs from products of the other mentioned type of calcination apparatus in that it produces more finely divided products with a larger specific surface. Thus this material is more reactive in the subsequent annealing step and requires lower temperatures or shorter reaction times until the desired increase in lightness is achieved (preferably 760°–840° C., 5–60 minutes).

The hot off-gases from the flash-heating apparatus are used to provide energy, as for example for the mill-drying of the moist, lumpy starting material, for preheating the air for the burner of the flash-heating apparatus and for heating the annealing apparatus.

The meta-kaolin discharged from the furnace can, in so far as it was obtained from finely powdered, preground kaolin, be directly added to the aqueous alkali solution. If the starting material is kaolin in lump form, the meta-kaolin obtained has to be finely milled prior to the reaction with the aqueous alkali metal hydroxide solution.

The meta-kaolin is advantageously reacted with dilute sodium hydroxide solution in known manner, for example, using the following molar ratios:
$Na_2O/SiO_2$—from 0.05–10
$H_2O/Na_2O$—from 15–70.

The $SiO_2/Al_2O_3$ ratio varies according to the different kaolins and is approximately 2.0.

The meta-kaolin is preferably heated for periods ranging from 0.5 to 24 hours, preferably from 1 to 8 hours, at temperatures of from 70° to 95° C. in 7 to 30% sodium hydroxide solution, the quantity of NaOH preferably amounting to 1.3 to 3 times the stoichiometric quantity required for the formation of zeolite A.

Various Examples illustrating the present invention in more detail are given below.

Comparison Example 1 involves a zeolite A which has been prepared according to the known art. The improvement in colour obtained in the subsequent Examples is seen clearly from a comparison with the comparison Example 1.

COMPARISON EXAMPLE 1

The selected kaolin was a bleached, milled fine paper kaolin having the following properties:
Mineral Composition:
 Kaolinite—94.5%
 Potash feldspar—3.7%
 Soda feldspar—0.6%
 Quartz—0.7%
 Remaining minerals—0.5%
Chemical analysis:
 $SiO_2$—46.9%
 $Al_2O_3$—38.1%
 $Fe_2O_3$—0.26%
 $TiO_2$—0.30%
 $K_2O$—0.63%
 $Na_2O$—0.07%
 CaO—0.03%
 MgO—0.04%
 $P_2O_5$—0.36%
 $MnO_2$—0.01%
 loss on ignition—13.15%
Grain structure according to Andreasen:
 20–40μ—0.1%
 10–20μ—4.5%
 6–10μ—11.1%

4-6μ—14.3%
2-4μ—24.3%
0-2μ—45.7%
Colour properties:
Lightness: 93.5
Yellowness b: 5.0.

300 g of this kaolin were annealed for 3 hours at 700° C. in a muffle furnace. 100 g of the resulting meta-kaolin were stirred up with 433 cc of 14% sodium hydroxide solution for 3 hours at 85° C. The crystal paste was then filtered off, washed with water until the pH was 10 and dried. According to X-ray analysis, the product obtained was well crystallised zeolite A. Calcium-exchange capacity: 150 mg CaO/g anhydrous zeolite A
  Lightness L: 92.3
  Yellow tinge b: 8.7

EXAMPLE 2

Fine paper kaolin was mixed with 1.35% of magnesium oxide (light, chemically pure) in a ploughshare mixer and calcined and converted to zeolite A as described in Example 1. X-ray analysis showed well crystallised zeolite A.
  Calcium-exchange capacity: 154 mg CaO/g anhydrous zeolite A:
  Lightness L: 94.1
  Yellowness b: 7.1

EXAMPLE 3

The calcination was conducted as in Example 2 with 1.35% of magnesium oxide, but for 1 hour at 880° C. and the meta-kaolin was converted into zeolite A. X-ray analysis showed well crystallized zeolite A.
  Calcium-exchange capacity: 157 CaO/g anhydrous zeolite A:
  Lightness L: 95.7
  Yellowness b: 4.8

EXAMPLE 4

Fine paper kaolin was mixed with 6.6% of barium carbonate (chemically pure) in a ploughshare mixer and 300 g of the mixture was calcined for one hour at 880° C.
The meta-kaolin obtained was converted into zeolite A. X-ray analysis showed well crystallised zeolite A.
  Calcium-exchange capacity: 144 mg CaO/g of anhydrous zeolite A:
  Lightness L: 96.1
  Yellowness b: 4.5

EXAMPLE 5

Fine paper kaolin was mixed with 1.35% of magnesium oxide and 1% soda in a ploughshare mixer; 300 g of this were introduced into a rotary furnace. Annealing was carried out at a maximum temperature of 880° C. and an average product residence time of 1 hour at this temperature. During annealing 10 l/h of CO were introduced. The meta-kaolin obtained was converted into zeolite A. X-ray analysis showed well crystallized zeolite A.
  Calcium-exchange capacity: 155 mg CaO/g anhydrous zeolite A:
  Lightness L: 96.3
  Yellowness b: 2.7

EXAMPLE 6–19 (TABLE 1)

In each case 300 g of kaolin were mixed with 1.35% of magnesium oxide (light, chemically pure) and the added amounts of alkali metal halides and aluminium halides (chemically pure) indicated in Table 1, as well as peat coke (<0.43 mm) in the case of Example 13, using a ploughshare mixer and the resulting mixture was annealed at 880° C. for one hour. The meta-kaolin obtained in this way was converted into zeolite A as in the comparison example 1.

According to X-ray analysis, the products obtained in Example 6–10 were in all cases well crystallized zeolite A.

TABLE 1

Brightness L and yellowness b of zeolite A
(addition in each case of 1.35% MgO and other additives for the annealing)

| Example | 1.35% MgO + additives: % alkali metal halides | % AlCl$_3$ | Reduction agent % | Ca-exchange-capacity (mg CaO/g) (anhydrous zeolite A) | L | b |
|---|---|---|---|---|---|---|
| 6 | 0,9% LiF | — | — | 134 | 96,8 | 3,0 |
| 7 | 1,45% LiCl | — | — | 140 | 95,5 | 2,4 |
| 8 | 3,0% LiBr | — | — | 153 | 96,3 | 4,3 |
| 9 | 1,4% NaF | — | — | 145 | 95,2 | 2,6 |
| 10 | 2,0% NaCl | — | — | 153 | 96,6 | 2,8 |
| 11 | 3,5% NaBr | — | — | 145 | 94,7 | 2,5 |
| 12 | 2,0% KF | — | — | 143 | 96,3 | 4,0 |
| 13 | 2,55% KCl | — | — | 143 | 95,4 | 2,3 |
| 14 | 4,1% KBr | — | — | 153 | 96,7 | 4,0 |
| 15 | 2,0% NaCl | 2,0 | — | 143 | 97,1 | 2,6 |
| 16 | 2,0% NaCl | — | 2,0% peat coal | 145 | 97,3 | 2,0 |
| 17 | 1,8% NH$_4$Cl | — | 1,0% peat coal | 151 | 96,9 | 3,3 |
| 18 | 2,0% NaCl | 2,0 | 2,0% peat coal | 147 | 97,5 | 2,7 |
| 19 | 2,0% NaCl | — | 1,0% Na$_2$SO$_3$ | 143 | 97,5 | 3,2 |

EXAMPLE 20

15 g of NaCl and 50 g of MgCl$_2$.6H$_2$O (in each case chemically pure) were dissolved in 1.1 l water and 1 kg of fine paper kaolin as well as 20 g of peat coal (0.43 mm) were added. The suspension was mixed for 15 minutes in a colloid mixer and subsequently dried at about 100° C. The dry residue was briefly ground up in a hammer mill and 300 g thereof were calcined for one hour at 880° C. The meta-kaolin obtained in this way was converted into zeolite A as in Comparison Example 1.

According to X-ray analysis the product obtained was well crystallized zeolite A.
  Calcium-exchange capacity: 145 mg of CaO/g anhydrous Zeolite A.
  Lightness L: 97.1
  Yellowness b: 3.0

EXAMPLE 21

100 g of fine paper kaolin were mixed with 1% of magnesium oxide (light, chemically pure) in a ploughshare mixer. The mixture was introduced into an indirectly heated rotary furnace having a quartz tube with an internal diameter of 60 mm and a heated length of 600 mm. A stream of carbon monoxide (10 l/h) was introduced into the rotary furnace during calcining (35 minutes, 750°–880° C.). The meta-kaolin obtained was converted into zeolite A as in Comparison Example 1.

According to X-ray analysis the product obtained was well crystallized zeolite A.

Calcium-exchange capacity: 151 mg CaO/g anhydrous zeolite A
Lightness L: 95.8
Yellowness b: 3.0

EXAMPLES 22–25 (TABLE 2)

For the following examples a mixture, produced in a ploughshare mixer, of 1.35% magnesium oxide (light, chemically pure) was introduced continuously into a flash-heating and annealing apparatus via a silo and an injection element.

In the flash-heating section the product was dehydrated in that by means of a pre-combustion chamber hot combustion gases of a temperature $T_E$ were introduced and the product sprayed in from above via an additional gas was brought to the desired starting temperature $T_A$. The discharge into an annealing tube was conducted by means of a cyclone. The residence time of the product therein was able to be set by the action of a sluice. The temperature $T_P$ in the product was close to $T_A$ which was reached by an additional electrical heating system and by good insulation of the annealing tube and of the cyclone. Just above the sluice carbon monoxide and optionally hydrogen chloride were able to be passed through the product. The brightened meta-kaolin was discharged via a sluice.

2 tons of the meta-kaolin brightened in this way were introduced, whilst hot, into a 20 m³ reaction container equipped with stirrer, in which 8.66 m³ of 14% strength sodium hydroxide solution were already placed and the mixture was stirred for 3 hours at 85° C. The crystal slurry obtained was thickened, washed to pH=10, worked up and dried.

In the examples 22–25 the product obtained was well crystallized zeolite A.

TABLE 2

Properties of zeolite A, produced from flash-heated kaolin

Conditions for production of meta-kaolin:
Additive: 1,35% by weight of MgO,
Throughput in the flash-heating: 20 kg/h
Residence time during the flash-heating: approximately 0.1 sec.
Ratio of natural gas: burner air = about 1:14
$T_E$:1,000–1,100° C.    $T_A$:800° C.

| Example | Residence time during annealing (min) | Gas addition (Nm³/h) CO | HCl | $T_p$ (°C.) | Ca-exchange capacity (mg CaO/g anhydrous zeolite A) | Lightness L | Yellowness b | spec. surface according to BET (m²/g) |
|---|---|---|---|---|---|---|---|---|
| 22* | — | — | — | — | 157 | 94,1 | 6,7 | 13,8 |
| 23** | 30 | — | — | 800 | 153 | 95,1 | 5,4 | 13,4 |
| 24** | 30 | 0,4 | — | 800 | 151 | 95,8 | 2,5 | 13,7 |
| 25** | 20 | 0,4 | 0,25 | 800 | 150 | 96,9 | 2,0 | 13,0 |
| 16 | by way of comparison, without flash-heating: | | | | 145 | 97,3 | 2,0 | 7,6 |

*Comparison Example 22: without annealing, without gas addition
**according to the invention

What is claimed is:

1. A process for the production of zeolite A from kaolin which comprises converting the kaolin into meta-kaolin at temperatures of between 700° and 950° C. in the presence of 0.1 to 10% by weight of alkaline earth compounds calculated as oxides, 0.1 to 10% by weight of an uncolored halide or halogen, and 0.1 to 10% by weight of an alkali metal compound, and reacting the meta-kaolin in an aqueous alkaline medium, wherein the conversion of the kaolin into metakaolin is carried out by flash heating at temperatures of between 600° and 1000° at a residence time of 0.01 to 5 seconds and subsequent annealing at temperatures between 700° and 950° C.

2. A process according to claim 1, wherein the converting of the kaolin into meta-kaolin is conducted under reducing conditions.

3. A process as claimed in claim 1, wherein the alkaline earth metal compound is at least one of magnesium oxide, magnesium carbonate and magnesium hydroxy carbonate.

4. A process as claimed in claim 1, wherein the alkali metal compound comprises soda.

5. A process as claimed in claim 1, wherein the halide is common rock salt or hydrogen chloride.

6. A process as claimed in claim 1 wherein the converting is conducted in the presence of carbon or CO-containing gases as reduction agent.

* * * * *